United States Patent [19]
Wriedt

[11] 3,863,983
[45] Feb. 4, 1975

[54] SEAT BELT SYSTEM
[76] Inventor: Alfred Wriedt, Friedrichshulderweg 186, 2083 Halstenbek, Germany
[22] Filed: Apr. 18, 1973
[21] Appl. No.: 352,354

[52] U.S. Cl. ............................ 297/388, 280/150 SB
[51] Int. Cl. ...................... A47c 31/00, A47d 15/00
[58] Field of Search ............................ 297/384–390; 281/150 SB, 179; 105/368; 254/51

[56] References Cited
UNITED STATES PATENTS
| | | | |
|---|---|---|---|
| 2,195,335 | 3/1940 | Lethern | 297/389 |
| 3,009,261 | 7/1963 | Doss et al. | 297/216 UX |
| 3,199,804 | 8/1965 | Fontaine | 280/150 SB |

Primary Examiner—Paul R. Gilliam
Assistant Examiner—Andrew M. Calvert
Attorney, Agent, or Firm—Bosworth, Sessions & McCoy

[57] ABSTRACT

Apparatus for holding and releasing the occupant of a passenger vehicle in and from a seat therein independently of manual assistance from the occupant, and including a pelvic strap, a shoulder strap, and a releasing strap and guiding and winching devices for lifting and lowering the shoulder strap from and on the seat occupant.

5 Claims, 2 Drawing Figures

SEAT BELT SYSTEM

BACKGROUND AND SUMMARY OF THE INVENTION

As demanded by safety considerations and progressively required by legislation, occupants of means of transport should be securely restrained in their seats in case of a crash. The only practical means available to this end at present are flexible belts to be voluntarily applied by the respective occupant.

The present designs of such safety belts suffer from several serious drawbacks and are beginning not to satisfy the law. Their main fault is that their use is discretionary and not automatic; they require action by the respective occupant. Even operatively coupling to the present-type safety belts devices which visually or audibly signal non-usage or interrupt the ignition do not compel use of the belts, nor are such arrangements inexpensive or tamper-proof. Often, even if belts are used, only their pelvic and not the shoulder portion is used. Also, the existing belts are troublesome and time-consuming to sort-out and to apply.

It is the aim of the invention to provide a solution which makes it possible for the occupants of a means of transport as an automobile, for example, to enter it and gain their respective seat unimpeded, obligatorily ties down their pelvic and shoulder region conveniently and comfortably, while permitting the driver to have full and safe control of the vehicle, reliably restrains their movement during any sudden forward and/or lateral deceleration of the car, removes quickly and conveniently the restraining means from the occupants at the end of a journey permitting their unimpeded egress, holds the restraining means in readiness for their renewed use during the next journey and, finally, in a case of emergency, permits the occupants easily and quickly to disencumber themselves individually of the restraining means or to permit rescuers to do this.

Apparatus of a kind to accomplish the foregoing aims and objects is described below and embodies the invention claimed herein. The most relevant, though patentably different and distinct, invention to that claimed herein and known to this inventor is that disclosed and claimed in the inventor's existing U.S. Pat. No. 3,685,799.

Apparatus embodying the invention comprises, first, at least one shoulder strap which is located in front of the occupant and is preferably led above, behind and below him where its rear end is attached to a winching device such as a motor driven drum. The forward end of this strap is removably attached to the bight of the pelvic strap the ends of which are attached to the lower structure of the car, its outer attachment point being movable longitudinally along part of the car. In addition the apparatus includes one releasing strap which is located and supported along and near the roof of the car and thence is led preferably behind the occupant where its lower end is attached to another winching device which operates in the opposite way. Its upper end is attached to a seam line on and intermediate the ends of the shoulder strap. The operation of the two winching devices is controllable so that the tightening up of the shoulder strap is always accompanied by a sufficient loosening of the releasing strap and vice versa.

In the operation of this apparatus from its starting point in the loosened mode a lashing down of the seated occupant against his seat and back rest is effected by means of a coordinated combination of two working strokes: Firstly, the shoulder strap is tightened and the releasing strap is correspondingly loosened resulting in a relocation of the seam between the two straps and a consequent transfer of the point of support of the shoulder strap from the front guide roller to the rear guide roller, and secondly, in addition and programmed in relation to this movement of the seam between the two straps, the movable point of attachment to the lower structure of the car of the outer end of the pelvic strap is moved to its rearward limit whereby the pelvic strap is brought to rest against and across the occupant in his pelvic region and the front portion of the shoulder strap against his torso and over his shoulder.

A loosening of the lashing is effected by the reverse procedure; i.e., the releasing strap is tightened and the shoulder strap is loosened resulting in the point of support of the shoulder strap to move from the rear roller to the front roller whereby the shoulder strap is lifted off the torso of the occupant. In this case also, in addition and programmed in relation to these strap movements, the movable point of attachment of the pelvic strap to the lower structure of the car is moved to its forward limit whereby the pelvic region of the occupant is released and the lateral barrier to his feet is removed. Thus he is enabled to leave his seat unimpeded. Also, upon entering the car, this loosened mode or position of the straps of the apparatus affords the occupant unimpeded ingress to his seat.

It is of particular advantage to design the apparatus in such a way that in the loosened mode a portion of the shoulder strap extends from a point at the forward outer edge of the car roof and crosses generally in front of the occupant without touching him. There the shoulder strap joins the bight of the pelvic strap extending from the point of attachment of its inner end to the lower structure of the car near the rearward inner corner of the occupant's seat across the occupant without touching him to the point of attachment of its outer end. The latter point of attachment is movable by a chain drive or other suitable device alongside a length of the outer edge of the car's lower structure. In the loosened mode this movable point of attachment is located at the front limit of its path of travel, preferably just ahead of the place for the occupant's feet. It is evident that when the apparatus of such an arrangement and design is in its loosened mode an occupant can gain and leave his seat unimpeded by any part of the apparatus. Further, the driver's forward view of the road and his ease of manipulating the steering wheel are so impaired by the lifted-off shoulder strap that the apparatus must be put into the tightened mode if the car is to be safely driven forward.

It is of further advantage to design the apparatus in such a way that in the tightened mode a portion of the tightening strap extends from a point rearward of the occupant at the outer edge of the car roof and crosses downwardly in front of and lies against the occupant to join the bight of the looped strap extending and lying between the point of firm attachment of its inner end across and against the occupant to the movable point of attachment of its outer end which in this tightened mode is located at the rear limit of its path of travel near the rearward outer corner of the occupant's seat. It is evident that when such apparatus is in its tightened mode an occupant is effectively held in his seat by straps across his outer shoulder, torso, and pelvic region and thus his movement is restrained in cases of sudden deceleration or jarring of the car.

It is apparent that the actuating means driving the drums, an electric motor, for example, can be controlled by a variety of well known and conventional means. While no particular control is contemplated by this invention, it is understood that the apparatus described comprehends and can be controlled by manually actuated means, means interlocked with operative elements of the vehicle such as the transmission lever, or by other means. Thus, the control can easily be made to operate automatically and without any special action on the part of the occupant of the car.

In a preferred embodiment of the invention, an emergency releasable lock assembly is provided in the bight of the looped strap. The assembly is preferably attached to that part of the bight coming from the fixed point of attachment. The ends of the tightening strap and of the movable portion of the looped strap are removably inserted into the assembly freeing these two ends upon operation of their emergency release by the occupant or by a rescuer, thus giving the occupant free egress from his seat even if the apparatus is in the tightened mode.

A particular advantageous feature of the invention is the incorporation into the tightening strap, and, if desired, also into the looped strap, of a buckle assembly permitting adjustment of the effective length of these straps, thus accommodating occupants of different height and bulk.

It is further advantageous to mount the tightening drum and the lifting drum on the same shaft of a rotating means whereby the tightening strap and the lifting strap are led onto these drums in opposite rotating directions.

One can also attach or otherwise incorporate cushioning means to certain portions of the tightening strap and the looped strap. If desired, portions of the various straps can be replaced by fiber or metal ropes, thereby facilitating their control and improving visibility from the car.

Also the tightening drum may be provided with a mechanism permitting slow relaxation of the tightening strap, thus enabling the occupant to lean forward, but resisting any sudden pull as would occur in case of a head-on or lateral crash.

Further, in order to prevent possible avoidance of the apparatus by the simple expedient of removing the respective ends of the tightening and looped strap from the emergency release lock, one can incorporate in the firmly attached portion of the looped strap two electric wires forming part of the ignition circuit which are connected to each other when the end fittings of the two respective straps are inserted in the lock. The removal of one or both from the lock cuts off the ignition.

A further advantage is that the apparatus belonging to one seat may be combined conveniently with that belonging to the neighboring seat in mirror-image configuration. The respective sets of tightening and lifting straps can be wound in the same rotational direction onto a tightening and onto a lifting drum common to both, in which case electrical controls of both apparatus can be combined into one, preferably to be activated by the driver of the car, or, if an obligatory control method is used, to be activated by such control.

Apparatus analogous to that intended for the front seat of a car may be installed in the rear seat to protectively restrain its occupants. The means to activate and control the respective straps belonging to the rear seats can be suitably combined with those pertaining to the front seats.

Furthermore, by making the lengths of respective tightening and looped straps suitably adjustable, such apparatus can, if desired, be adapted to contain two occupants instead of one, thus making such a system usable in a five passenger car. As a further aid in thus accommodating two occupants, the inner portion of the looped strap can be attached to the lower structure of the car or to the respective seat by means of a lateral slide.

DETAILED DESCRIPTION OF A PREFERRED EMBODIMENT

Figure 1:
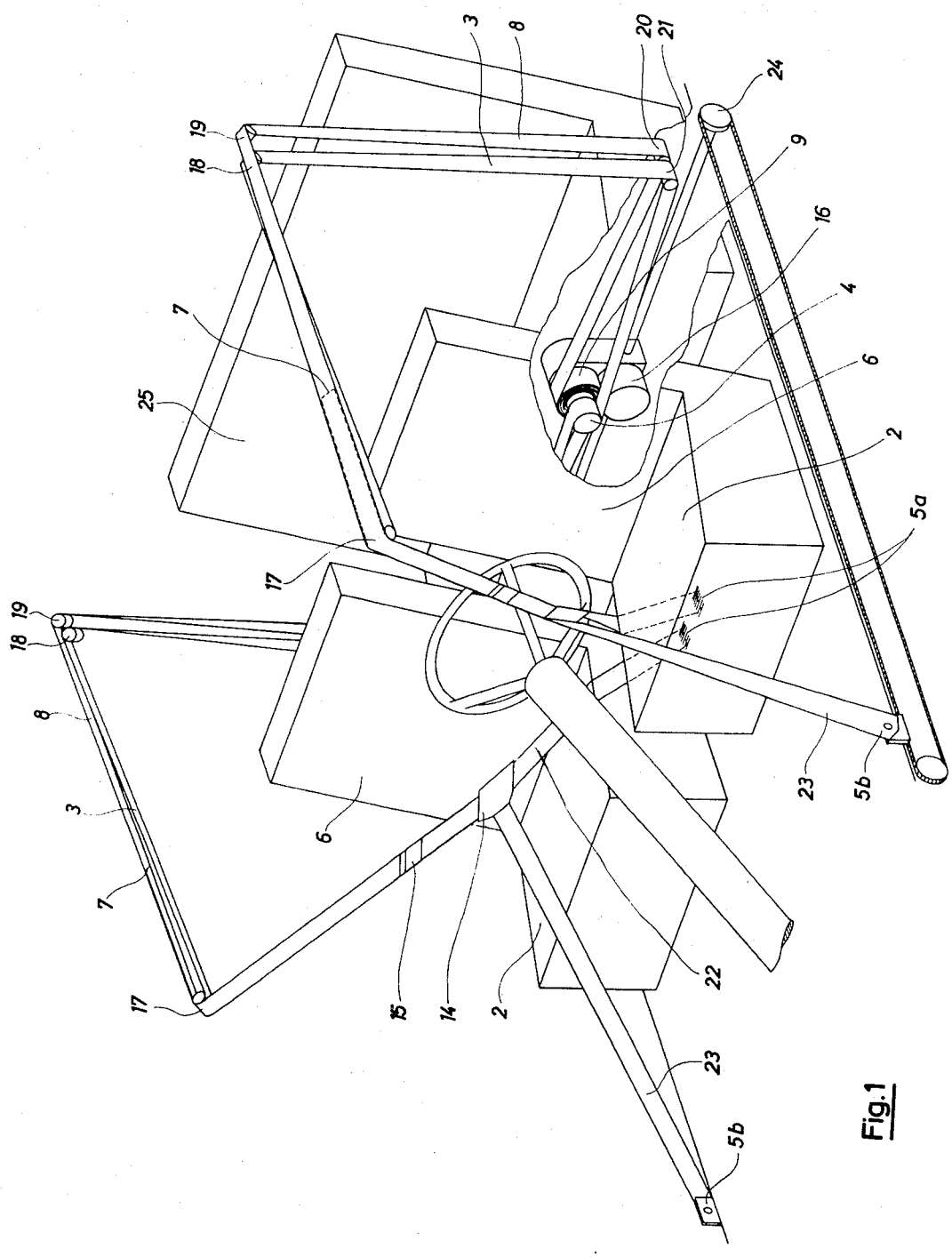
FIG. 1 is a representation in perspective of apparatus embodying the invention for each of the two front seats of a passenger car and shown in its loosened mode and simplified to illustrate clearly the principle of the invention.

FIG. 1 shows both the right-hand and the left-hand apparatus embodying the invention installed in a passenger car and in the loosened mode.

The flexible tightening strap 3 extends as follows: From its releasable attachment with release lock 14 via adjustment buckle 15 to and over guide roller 17 located at a forward point of the outer edge of the car roof, close under the car roof to seam 7 where it is connected to the end of the lifting strap 8, doubling back to and over guide roller 17 rearward close under itself and lifting strap 8 to and over guide roller 18 which is located at a point along the outer edge of the car roof rearward of the front seat, down to guide roller 21 located close to the side wall of the car, and finally almost completely uncoiled and in common with tightening strap 3 of the neighboring apparatus to its twist-tight attachment on tightening drum 4 of rotary actuator 16 located somewhere near and/or under rear seat 25. Rotary actuator 16 is not necessarily located in the car's center-line, and it is preferably common to both the apparatus. It is driven by an electric motor powered by the electrical system of the car, for example.

All guide rollers 17, 18, 19, 20, and 21 are so positioned that their axes tend to conform to the adjacent contours of the car body. Also, they may be equipped with end flanges (not shown in the drawings) to better guide the straps.

Releasing strap 8 extends as follows: From its attachment to shoulder strap 3 at seam 7 close under the car roof to and over guide roller 19 which is located close to guide roller 18, down to guide roller 20 and finally, fully coiled and in common with releasing strap 8 of the neighboring apparatus to its twist-tight attachment on loosening drum 9 of winch 16.

One end of inner portion 22 of the pelvic strap is attached to the lower structure of the car in fixed point of attachment 5a, and its other end is attached to release lock 14. One end of outer portion 23 of the pelvic strap is releasably attached to release lock 14, and the other end to movable point of attachment 5b which is now located just ahead of the occupant's feet at the outer edge of the car's lower structure. Point of attachment 5b is movable by chain drive 24 and is shown in FIG. 1 just ahead of the place for the occupant's feet.

Figure 2:
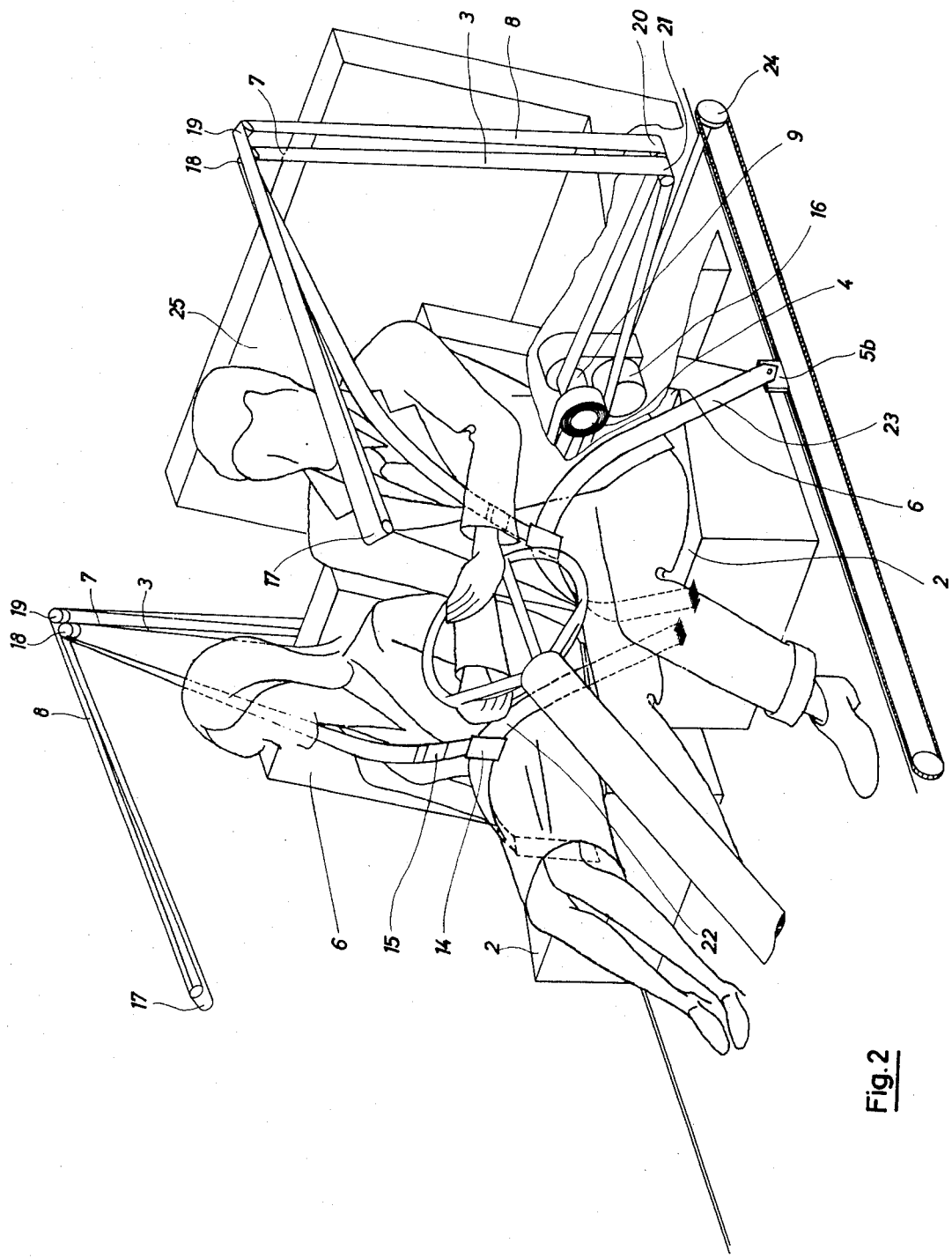
FIG. 2 shows both apparatus of FIG. 1 in their tightened mode.

In changing from the loosened mode shown in FIG. 1 to the tightened mode shown in FIG. 2, winch 16, in response to a suitable control signal, uncoils releasing straps 8 of both apparatus from loosening drum 9 and simultaneously coils up shoulder straps 3 of both apparatus onto tightening drum 4, whereby the beginning of the slackening of the releasing straps proceeds faster than the corresponding coiling-up of the shoulder straps and thus, by easing the tension of the various straps, facilitates the transition. Also during this transition, and suitably programmed by conventional control means in relation to the counteraction of shoulder and releasing straps, chain drive 24 moves point of attachment 5b of the pelvic strap to its rearward limit near the rearward outer corner of the occupant's seat alongside the outer edge of the car's lower structure. It is evident that during this phase seam 7 moves along a path close under the roof of the car to just around guiding roller 18 and that therefore the effective pull of shoulder strap 3 is being transferred from guiding roller 17 to guiding roller 18. Also, the effective pull of the pelvic strap has been transferred from the forward to the rearward limit of the path of travel of point of attachment 5b.

FIG. 2 shows both the right and left-hand apparatus embodying the invention installed in a car in the tightened mode.

Shoulder strap 3 now extends as follows: From its releasable attachment to release lock 14 via adjustment buckle 15 directly to and over the guide roller 18 so that the strap lies firmly against and across the torso and outer shoulder of the occupant strapping him against base 2 and back rest 6 of his seat, down to and around guide roller 21, and finally, fully coiled and in common with shoulder strap 3 of the neighboring apparatus to its twist-tight attachment on tightening drum 4 of winch 16. Releasing strap 8 now extends as follows: From its attachment to shoulder strap 3 at seam 7 located between guide rollers 18 and 21, doubling with shoulder strap 3, to and around guide roller 18 close under itself forward to and around guide roller 17, close under the car roof rearward to and around guide roller 19, down to and around guide roller 20, and finally, almost uncoiled and in common with releasing strap 8 of the neighboring apparatus to its attachment on loosening drum 9 of winch 16.

As shown in FIG. 2, the pelvic strap extends between the same points of attachment as in FIG. 1, excepting that point of attachment 5b has now been moved rearward along a length of the outer edge of the car's lower structure to its rear limit near the rearward outer corner of front seat 2.

The embodiment described above can, of course, be modified without departing from the basic concept of the invention. For instance, the winch driven by an electric motor can be replaced by a manually activated hand lever or pulley arrangement. Also, the location and arrangement of the rollers guiding and coiling the various straps can be modified.

The foregoing embodiment may be modified to increase its utility, convenience and application in various situations. For example, if three people are to occupy the front or rear seat of a car equipped with a right-hand and a left-hand apparatus of the type described above, the end of the inner portion 22 of the pelvic strap is preferably attached to the lower structure of the car at least at seat level or lower by means of a laterally sliding point of attachment.

Such a point of attachment can be a piece of track of suitable length carrying a slide or car slideably attached to the track for movement along its length. The track is located generally in the middle of the width of the automobile and extends laterally of or across the automobile. The end of the inner portion of either the right-hand or left-hand pelvic strap, or both, are attached to the slide or car slideably carried by the track. By this means the inner point of attachment of one of the pelvic straps, or both, can be slid right or left to accommodate and protect one or two persons. The particular means for providing the laterally slideable point of attachment form no part of this invention and conventional means utilized as outlined above comprehends this form of the invention.

Two apparatus may be combined and used advantageously in a fore and aft or tandem relationship as well as side by side in a vehicle. For example, in a vehicle having both front and rear seats equipped with apparatus embodying this invention, the shoulder straps of the front and rear apparatus on the right-hand or the left-hand side can be wound together in the same rotational direction on a common tightening drum. This reduces the total mechanism required and simplifies the total combination.

Similarly, the releasing straps of the apparatus in the front and rear seat on one side of the car may be advantageously wound together in the same direction on a common loosening drum.

Those skilled in the art will appreciate that various other changes and modifications can be made in the preferred form of apparatus described herein without departing from the spirit and scope of the invention.

I claim:

1. Apparatus for holding and releasing the occupant of a passenger vehicle in and from a seat therein independently of manual assistance from the occupant, said apparatus comprising, a pelvic strap connected to and extending between an inner point of attachment to the lower structure of the vehicle near its longitudinal centerline and on one side of the occupant's place and outer point of attachment to the lower structure of the vehicle on the other side of the occupant's place to provide a bight in said strap for passing over the pelvic region of a seat occupant and for holding the pelvic region of the occupant on the base and against the back rest of the seat, said outer point of attachment to which said pelvic strap is connected being movable fore and aft of the vehicle from an aft position for holding the bight of said pelvic strap in a restraining relationship with a chair seat occupant to a forward position permitting unobstructed access to and from the chair seat on the side of said movable point of attachment, a shoulder strap and associated winching means attached to the structure of the vehicle, a releasing strap and associated winching means attached to the structure of the vehicle, guide means for guiding and positioning said shoulder strap and said releasing strap during operation of the apparatus, said guide means comprising a forward guide device attached to the upper vehicle structure forward of the seat and an after guide device attached to the upper vehicle structure behind the seat, said shoulder strap being connected to the bight of said pelvic strap at a point intermediate its ends and extending therefrom to and being guided by said guide means and thence to said associated winching means for guiding, positioning and tensioning said shoulder strap to and between a restraining and a releasing relationship with a seat occupant upon retraction and extension, respectively, of said associated winching means, said releasing strap being connected to said shoulder strap at a point intermediate its ends and extending therefrom to and being guided by said guide means and thence to said associated winching means for guiding, positioning and tensioning said releasing strap to and between positions for lowering said shoulder strap into its restraining relationship with a seat occupant upon extension of said releasing strap winch and for lifting said shoulder strap into its releasing relationship with a seat occupant upon retraction of said releasing strap winch, said shoulder and said releasing strap being operatively related to said guide means whereby said shoulder strap in its restraining relationship with a seat occupant extends from said pelvic strap across the upper torso of the seat occupant to its said after guide device and to its associated winching means and said releasing strap extends from said shoulder strap over said after guide device forward to said forward guide device and thence rearward to said after guide device and to its associated winching means, and whereby said shoulder strap in its releasing relationship with a seat occupant is lifted from the upper torso of the seat occupant and its point of attachment with said releasing strap is carried up to and over said forward guide device by retraction of said releasing strap, means to move said movable point of attachment to which said pelvic strap is connected, the operation of said means and said winching means associated with said shoulder strap and with said releasing strap being coordinated so that said movable point of attachment of said pelvic strap moves forward and said shoulder strap loosens and said releasing strap lifts said shoulder strap forward and away from a chair seat occupant to provide unobstructed access to and from said chair seat, and so that said movable point of attachment of said pelvic strap moves aft and said shoulder strap tightens and said releasing strap allows said shoulder strap to tighten into a restraining relationship with said chair seat occupant.

2. Apparatus according to claim 1 together with lock means to releasably divide said pelvic strap intermediate its ends and separate said shoulder strap therefrom.

3. Apparatus according to claim 1 in which the straps are replaced at least in part by stranded tension members.

4. The combination of two apparatus according to claim 1 in conjunction and in mirror image arrangement.

5. The combination of two apparatus according to claim 1 in conjunction and located one substantially behind the other in a fore and aft direction in relation to the vehicle.

* * * * *

UNITED STATES PATENT OFFICE
CERTIFICATE OF CORRECTION

PATENT NO. : 3,863,983

DATED : February 4, 1975

INVENTOR(S) : Alfred Wriedt

It is certified that error appears in the above-identified patent and that said Letters Patent are hereby corrected as shown below:

Column 2, line 57, change "tightening" to --shoulder--
          line 60, change "looped" to --pelvic--
Column 3, lines 4 and 5, change "actuating means driving the drums," to --winching means, driven by--
          lines 9 and 10, change "manually actuated means," to --winching--
          line 19, change "tightening" to --shoulder--
          line 20, change "looped" to --pelvic--
          line 27, change "tightening" to --shoulder--
          line 28, change "looped" to --pelvic--
          line 34, change "tightening" to --shoulder-- and change "lifting" to --releasing--
          line 38, change "tightening" to --shoulder--
          line 39, change "looped" to --pelvic--
          line 45, change "tightening" to --shoulder--
          line 51, change "tightening" to --shoulder-- and change "looped strap" to --pelvic straps--
          line 53, change "looped" to --pelvic--
          line 61, change "tightening" to --shoulder-- and change "lifting" to --pelvic--
Column 4, line 8, change "tightening" to --shoulder-- and change "looped" to --pelvic
          line 13, change "looped" to --pelvic--
          line 31, change "tightening" to --shoulder--
          line 36, change "lifting" to --releasing--
          line 38, change "lifting" to --releasing--
          line 42, change "tightening" to --shoulder--
          line 44, change "rotary actuator" to --a winching device--
          lines 45 and 46, change "Rotary actuator" to --The winch--

Signed and Sealed this twenty-fifth Day of November 1975

[SEAL]

Attest:

RUTH C. MASON
Attesting Officer

C. MARSHALL DANN
Commissioner of Patents and Trademarks